United States Patent Office 3,150,124
Patented Sept. 22, 1964

3,150,124
SYNTHESIS OF KINETIN GLYCOSIDES
George Svarnas, Frederick, Md., and Herman Rutner, Queens Village, N.Y., assignors to the United States of America as represented by the Secretary of the Army
No Drawing. Filed Mar. 16, 1962, Ser. No. 180,944
4 Claims. (Cl. 260—211.5)
(Granted under Title 35, U.S. Code (1952), sec. 266)

The invention described herein may be manufactured and used by or for the Government of the United States of America for governmental purposes without the payment to us of any royalty thereon.

This invention relates to the preparation of 6-furfurylamino-9-($\beta$-D-ribofuranosyl) purine, also known as kinetin riboside. In the past, this compound has been prepared by one of two methods. The method of Henry M. Kissman and Martin J. Weiss appeared in the Journal of Organic Chemistry, vol. 21, pp. 1053–55 (1956). Subsequently, U.S. Patent No. 2,881,164, April 7, 1959, was issued for the same process. A second method by Alexander Hampton, John J. Biesele, Alice E. Moore and George Bosworth Brown appeared in Journal of the American Chemical Society, vol. 78, 5695 (1956).

The method of Kissman and Weiss is a 9-step synthesis starting with D-ribose and concluding with the kinetin riboside at an overall yield of about 22%. This process normally requires several weeks to carry to completion. The method of Hampton, et al. is a 3-step synthesis involving the reaction of the chloromercuri derivative of 6-methylmercaptopurine and 2,3,5-tri-O-acetyl-D-ribofuranosyl chloride. Three steps are required for the preparation of the unstable chloro-sugar from D-ribose and an additional step for the preparation of the chloromercuri derivative of 6-methylmercaptopurine, hence the total synthesis requires 7 steps. The overall yield is about 10%.

The present invention is a two-step method for preparing 6-furfurylamino-9-($\beta$-D-ribofuranosyl) purine. It includes a furoylation step (a) in which 2-furoyl chloride is reacted with adenosine in the presence of a suitable solvent to yield a tetrafuroylated product, 6-furoylamino-9-(tri-O-furoyl-$\beta$-D-ribofuranosyl) purine. It includes further a reduction step (b) in which 2 different reductive changes are simultaneously brought about in the above molecule. The first involves the conversion of the carbonyl group of the furoylamino side-chain to a methylene group and the second involves the reductive removal of the 3 furoyl groups from the sugar residue, resulting in the regeneration of the original free ribofuranosyl group. This double reduction step is carried out in a suitable inert solvent using lithium aluminum hydride as the reducing agent.

The following example illustrates the preparation:

*Furoylation Step.*—1.95 g. (0.0073 mole) of dried (2 hrs at 60° C. under vacuum) adenosine was suspended in 25 ml. of dry pyridine. 10 ml. (0.070 mole) of 2-furoyl chloride was then added and the mixture refluxed for 30 minutes. The reaction mixture was then cooled and the solvent and excess 2-furoyl chloride removed in vacuo. The heavy residual sirup was dissolved in 75 ml. of chloroform and the solution washed successively with 25 ml. of water, 5–25 ml. portions of 0.1 N hydrochloric acid, 25 ml. of saturated aqueous sodium bicarbonate solution, and 2–25 ml. portions of water. The organic phase was then treated for 15 minutes with a mixture of 5 g. of anhydrous magnesium sulfate and 2 g. of Norit, filtered, and the residue washed with 50 ml. of chloroform. The washings and the filtrate were then combined and the solution was concentrated (room temperature, in vacuo) to about 25 ml., 4.0 g. of silicic acid (100 mesh) added, and the mixture heated for 5 minutes, filtered and the silicic acid washed with 30 ml. of hot chloroform. The filtrate and washings were combined and evaporated to a heavy sirup in vacuo. The sirup was then extracted with 2–25 ml. portions of warm ether and the residue dried in vacuo, yielding 4.7 g. (100%) of a buff-colored fluffy solid. This product is then subjected to reductive treatment without further purification.

*Reduction Step.*—To 25 ml. of redistilled diethylene glycol dimethyl ether contained in a 200 ml. 3-neck round-bottom flask equipped with an addition funnel and drying tube was added 2.25 g. (0.059 mole) of lithium aluminum hydride. To this stirring mixture was then added 4.5 g. (0.00699 mole) of crude 6-furoylamino-9-(tri-O-furoyl-$\beta$-D-ribofuranosyl) purine contained in 25 ml. of diethylene glycol dimethyl ether over a period of 30 minutes (slight exothermic reaction). After the addition is complete, the reaction mixture is heated at 48–51° C. for 30 minutes. The mixture is then cooled and 10 ml. of ethyl acetate added, followed by the careful addition of 10 ml. of water with stirring over a period of 10 minutes. The pH is immediately adjusted to the range 6–7 with concentrated hydrochloric acid, the mixture filtered, and the solid washed with 50 ml. of warm methanol. The washings and filtrate were then combined and concentrated in vacuo with the aid of a water-bath, the temperature of which was held below 65° C. The heavy residual sirup was taken up in 25 ml. of absolute methanol and refrigerated overnight. The mixture, from which crystals had deposited, was then filtered and the crystals washed with a small amount of chilled methanol. After recrystallization from acetone-petroleum ether (B.R.=30–75° C.), the white crystalline product had a M.P.=151–153° C. (sinters below M.P.). The yield was 0.29 g., or 12%. The overall yield for both steps was also 12%.

Physical constants for our product compared to the published values for the material of the process of Kissman and Weiss, and Hampton, et al. is shown in the following table:

Table I

| Method of preparation | M.P., ° C. | Optical rotation (in ethanol) $[\alpha]_D^{25}$ | RF (System: n-butanol-Water) |
|---|---|---|---|
| Svarnas and Rutner | c151–153 | −63.5° (c=1.089) | a 0.73 |
| Kissman and Weiss | 148–150 | −63.5° (c=1.134) | a 0.73 |
| Hampton, et al | 151–152 | | a, b 0.72 | a Values obtained when our product, material prepared in our laboratory by the method of Kissman and Weiss, and authentic kinetin riboside obtained from Hampton et al. were chromatographed simultaneously on a single sheet of paper.
b Value reported by Hampton, et al.
c Corrected value, determined on the Kofler M.P. apparatus.

In addition to the above, two other criteria served to further confirm that the products obtained by the three procedures are identical: (a) The infrared spectra of all three products referred to in footnote a, Table I, were determined by the KBr pellet method on a Perkin-Elmer (Model 21) Recording Infrared Spectrophotometer and were found to be identical. (b) Samples of our product and authentic kinetin riboside (Hampton, et al.) were recrystallized from methanol and their melting points, together with a mixed melting point, were obtained immediately after recrystallization. The melting characteristics in all three determinations were identical, with no depression observed in the mixed melting point determination.

With respect to operative ranges, the following table gives the variations in time, reaction temperature, and solvent system which were tried and found to yield measurable amounts of kinetin riboside:

Table II

| | FUROYLATION STEP | | | | | | | |
|---|---|---|---|---|---|---|---|---|
| Time, hrs | 0.5 | 0.5 | 4 | 7.5 | 16 | 48 | 48 | 48 |
| Temperature | Reflux | Reflux | R.T.a | R.T.a | R.T.a | R.T.a | 38° C | 38° C |
| Solvent | Pyridine | Pyridine | Pyridine | Pyridine | Pyridine | Pyridine | Pyridine | Pyridine. |

| | REDUCTION STEP | | | | | | | |
|---|---|---|---|---|---|---|---|---|
| Time, hrs | 0.5 | 0.5 | 0.5 | 0.5 | 0.5 | 0.5 | 1.0 | 0.5 |
| Temperature | Reflux | 50° C | R.T.a | R.T.a | R.T.a | R.T.a | R.T.a | Reflux. |
| Solvent | Etherdioxane | Diethylene glycol dimethyl ether. | Tetrahydrofuran. | Tetrahydrofuran. | Tetrahydrofurna. | Tetrahydrofuran. | Tetrahydrofuran. | Tetrahydrofuran. | a R.T.=room temperature, about 25° C.

Several variants of the described process are possible without departing from the spirit of the invention.

First, the introduced furoyl group may be substituted by an analogous aromatic, aliphatic, or other heterocyclic group. Similarly, instead of being in the form of an acid chloride, the introduced group may alternatively be in the form of another acid halide or the acid anhydride. In support of this variant, a test was made using furoic anhydride as furoylating agent. This proved to be successful but resulted in a lower yield than that obtained with furoyl chloride. Instead of adenine, the purine base which is the central component of the kinetin riboside molecule, some other suitable purine base, such as guanine, may be substituted. Alternatively, a suitable pyrimidine base, such as cytosine or 5-methyl-cytosine may be substituted. In place of the β-D-ribofuranosyl group, which is the carbohydrate component of kinetin riboside, some other suitable carbohydrate residue, such as the D-2-deoxyribofuranosyl group or the L-arabinopyranosyl group, may be substituted. Variations in the reduction step are shown in Table II.

A flow sheet of the reaction follows:

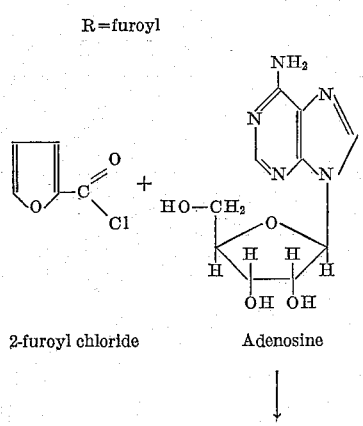

2-furoyl chloride    Adenosine

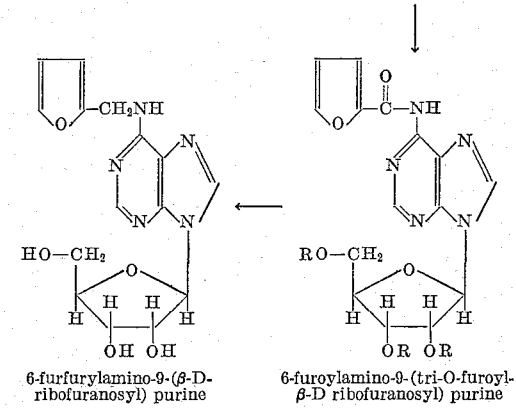

6-furfurylamino-9-(β-D-ribofuranosyl) purine    6-furoylamino-9-(tri-O-furoyl-β-D ribofuranosyl) purine

We claim:
1. A method of making kinetin riboside which comprises furoylating adenosine with 2-furoyl chloride and reducing the resulting 6-furoylamino-9-(tri-O-furoyl-β-D-ribofuranosyl) purine with a mild reducing agent to form the kinetin riboside.
2. A process in accordance with claim 1 wherein the reducing agent is lithium aluminum hydride.
3. A process in accordance with claim 1 wherein the furoylating step is carried out in the presence of dry pyridine.
4. A method of making a kinetin glycoside which comprises furoylating the adenine glycoside with a member of the group consisting of 2-furoyl chloride and 2-furoic anhydride and reducing the resulting 6-furoylamino (poly-O-furoyl-glycosyl) purine with a mild reducing agent to form the kinetin glycoside.

References Cited in the file of this patent

Adkins et al.: J.A.C.S., vol. 56, page 247 (1934).
Wagner and Zook: Synthetic Organic Chemistry, pages 566–568, John Wiley and Sons, Inc., New York (1953).
Hall et al.: J.A.C.S., vol. 77, page 6400 (1955).